United States Patent

Strathdee

[11] 3,900,557
[45] Aug. 19, 1975

[54] ANCHORED HOMOGENEOUS-TYPE CATALYSTS FOR H-D EXCHANGE

[75] Inventor: Graeme Gilroy Strathdee, Pinawa, Canada

[73] Assignee: Atomic Energy of Canada Limited, Ottawa, Canada

[22] Filed: July 16, 1973

[21] Appl. No.: 379,272

[30] Foreign Application Priority Data
July 19, 1972  Canada.............................. 147481

[52] U.S. Cl............ 423/580; 252/431 R; 252/431 P
[51] Int. Cl.²... B01J 11/00; C01B 4/00; C01B 5/02
[58] Field of Search............ 252/470, 431 P, 431 R; 423/580, 648

[56] References Cited
UNITED STATES PATENTS
3,681,021  8/1972  Mikorsky et al.................... 423/580
3,789,112  1/1974  Pachaly.............................. 423/580

Primary Examiner—John H. Mack
Assistant Examiner—A. C. Prescott
Attorney, Agent, or Firm—Lorne C. Shaw

[57] ABSTRACT

A process is described for preparing anchored, transition metal catalysts by a displacement reaction in which the diphenylphosphino group on a cross-linked polystyrene of the general formula:

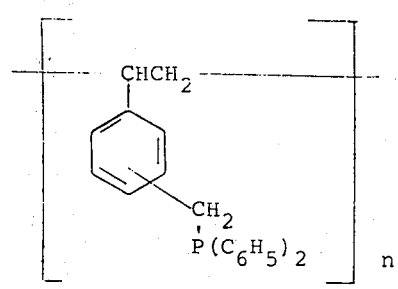

irreversibly displaces a more weakly bound ligand in the coordination sphere of an homogeneous transition metal catalyst complex. The preferred transition metals are rhodium, ruthenium and iridium. The anchored catalysts, are generally useful in promoting H-D exchange between hydrogen-containing gas streams and liquid water or alcohols. These catalysts are also active in hydrogenation, hydroformylation and polymerization reactions.

5 Claims, No Drawings

ANCHORED HOMOGENEOUS-TYPE CATALYSTS FOR H-D EXCHANGE

This invention relates to the synthesis and utilization of anchored, transition metal catalysts. More specifically, the invention relates to an anchored, transition metal catalyst system in which the transition metal is selected from the group consisting of ruthenium, rhodium and iridium and in which the stabilizing ligand is a functional group chemically attached to a cross-linked polystyrene.

In order to obtain satisfactory reaction rates in processes for the enrichment of deuterium, it has been considered necessary to use conventional, supported metal catalysts. These are heterogeneous catalysts having the metals deposited as crystallites of metal atoms on solid supports. They are used in gas or liquid phase reactions. Such heterogeneous catalysts have never proven entirely satisfactory for deuterium enrichment processes in the liquid phase. The major limitation in the use of conventional heterogeneous catalysts was the loss of activity, by a factor of about 1000, when such catalysts were used in the liquid phase as compared with the gas phase for the reaction:

$$HD + H_2O \rightleftharpoons H_2 + HDO$$

This effect has been well documented by G. M. Murphy, Ed. in "Production of Heavy Water," National Nuclear Energy Series III, McGraw-Hill, 1955. Because of this limitation of utility of heterogeneous catalysts, homogeneous transition metal catalysts have been developed for promoting reactions in the liquid phase.

Certain complexes of transition metals, such as Co, Rh, Ru, Ir and the like, exhibit unusual properties due to coordinative unsaturation. The complexes consist of ions of the metals coordinated to side groups called ligands. Some complexes of this type are soluble in liquids and act as homogeneous catalysts.

For an homogeneous transition metal catalyst to promote the sufficiently rapid transfer of hydrogen or deuterium for the purpose of deuterium enrichment, to promote the hydrogenation of olefins, or to promote other related reactions which require the generation of a metal-hydrogen bond, such as hydroformylation and polymerization, it is desirable to achieve such high concentrations of dissolved catalyst that the solubility limit of its starting or intermediate species is exceeded. The solubilities of attractive homogeneous catalysts are often extremely low in protic solvents - those containing hydrogen attached to oxygen or nitrogen - such as water and alcohols. Furthermore, a dissolved catalyst is usually difficult to recover from the reaction medium.

In order to overcome the difficulties experienced with heterogeneous and homogeneous transition metal catalysts of the prior art, it is now proposed that anchored catalysts be prepared by chemically attaching homogeneous transition metal catalyst complexes to suitable functional groups on porous, polymeric substrates, thereby forming catalyst systems having different chemical and physical properties but retaining the catalytic capabilities of the complexes.

The anchored, transition metal catalysts of this invention may be used in a manner similar to supported metal heterogeneous-type catalysts, with the qualification that they are intended for use in the liquid phase and will not likely function in the gas phase. For ease in handling, the anchored resin catalyst may be prepared in various physical forms and shapes, such as spherical beads (for example of 1 mm diameter), sheets, etc. The anchored catalysts are therefore easily recovered from reaction mixtures and excessive loss of the metal involved can be avoided. Since anchored catalysts can be suspended in the solvent medium without loss of activity, they can be used in amounts which exceed the solubility limits of the corresponding homogeneous catalysts.

According to the invention, the resin used for anchoring the transition metal was synthesized by following the method of C. TAMBORSKI as reported in J. ORG. CHEM. 27, 619(1962). A porous polystyrene (provided by Rohm and Haas under their designation GRA-806, and described as being a macroreticular copolymer of styrene and divinylbenzene that has been chloromethylated) was reacted with diphenylphosphinolithium as follows:

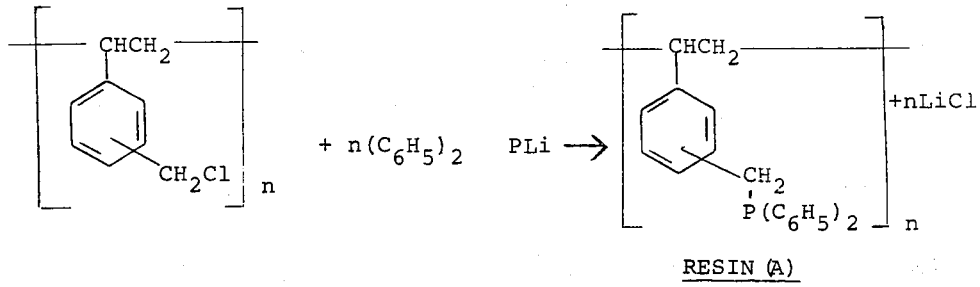

RESIN (A)

Polymerization of the styrene monomer with small amounts of divinylbenzene, for example 1-5%, yields a cross-linked polymeric product with more useful properties (insolubility, stability, etc.) than polystyrene would have alone. The divinylbenzene enables chains to cross-link by bridging adjacent polymer chains. The subscript "$n$" is difficult to define numerically in a three-dimensional network.

In accordance with the present invention, anchored, transition metal catalysts have been prepared by displacement reactions in which the diphenylphosphino group, $(C_6H_5)_2P-$, on Resin (A) irreversibly displaces a more weakly bound ligand in the coordination sphere of the catalyst complex. For example, olefins and some carbonyl groups have been displaced as shown in the following equations, involving various rhodium, ruthenium and iridium compounds.

[1] Resin (A) + $[(C_2H_4)_2RhCl]_2$ → $4C_2H_4$ + Resin-RhCl

The dimeric rhodium compound, tetraethylene dichloro rhodium [1] was complexed by the diphenylphosphino group, releasing ethylene and probably cleaving the chlorine bridge. The exact nature of the reaction has not been determined.

[2] Resin (A) + $(C_2H_4)_2Rh(acac^*)$ → $2C_2H_4$ + Resin-Rh(acac)

[2a] Resin Rh(acac) + HCl → Resin RhCl + acetylacetone.

* acac - acetylacetonate

The product of reaction [2], Resin-Rh(acac), must be converted by reaction with HCl to form the anchored complex active for catalysis of deuterium exchange.

[3] 2 Resin (A) + $Rh_2(CO)_4Cl_2$ → 2CO + 2 Resin-Rh(CO)Cl

The product of reaction [3], Resin-Rh(CO)Cl, is analogous to $(PPh_3)_2$ RhCOCl and is likewise an effective hydroformylation and hydrogenation catalyst, but it does not catalyze D-exchange.

[4] $[Ru_5Cl_{12}]^{2-}$ + Resin (A) → Resin-RuCl_2 +.

The cluster anion $(Ru_5Cl_{12})^{2-}$ is known to react with triphenylphosphine to yield the complex $RuCl_2(PPh_3)_3$ which is an effective homogeneous catalyst. Reaction [4] results in an anchored $Ru^{(II)}$ complex, an $Ru^{(III)}$ complex, or a mixture of the two species. Addition of $TiCl_3$ as a co-catalyst, to reduce any $Ru^{(III)}$ to $Ru^{(II)}$, was found to increase slightly the activity of the catalyst in $D_2$-ethanol exchange reactions.

[5] Resin (A) + Ir(cyclo-octene)_2 Cl → 2(cyclo-octene) + Resin-IrCl

The product of reaction [5] is the most active of the anchored catalysts of reactions [1] to [5], per mole of complexed metal. However, the rhodium catalysts are easiest to prepare and more rhodium complexes with suitably weak ligands are available for experimentation than such ruthenium and iridium complexes.

The preferred embodiment of this invention involves the use of a soluble transition metal complex having a small ligand, weaker than the diphenylphosphino group of the resin, and volatile when displaced, such as ethylene or carbon monoxide. Such reactions give rapid, quantitative results. The use of an olefin-containing starting material is generally preferred.

None of the anchored rhodium, ruthenium and iridium catalysts prepared by the processes of reactions [1] to [5] exhibits X-ray diffraction patterns (powder method) characteristic of its respective metal. The anchored catalysts prepared from rhodium $^{(I)}$ complexes possessing ligands with intense carbonyl absorptions in the infrared, such as Resin-Rh(acac) and Resin-Rh(CO)Cl, also have carbonyl absorptions but these are shifted from those of the starting carbonyl compounds, thus demonstrating that new complexes have been formed. Exposure of the anchored complexes of the present invention to hydrogen does not result in reduction to the respective transition metals. For these reasons, it is considered that the anchored catalysts of this invention are not heterogeneous supported-metal catalysts, but analogues of homogeneous catalysts chemically attached to the polystyrene supporting resin.

The invention is further described by reference to the following Examples which are not to be considered limiting.

EXAMPLE Ia

Preparation of Complexing Resin (A)

The diphenylphosphino-substituted polystyrene resin was prepared by reacting an excess of diphenylphosphinolithium with chloromethylated styrene divinylbenzene copolymer (Rohm and Haas GRA-806).

By slowly adding 25 ml. diphenylchlorophosphine (0.1 mol) in 85 ml. anhydrous tetrahydrofuran (THF) to 3.5 g. lithium metal (0.5 mol) in 100 ml. THF under nitrogen, diphenylphosphinolithium was prepared quantitatively. The addition of 10g of the chloromethylated resin (5.7 milliequivalents Cl/g) to a filtered solution of excess diphenylphosphinolithium at 25°C gave a product containing 2.97 meq. - $P(C_6H_5)_2/g$.

EXAMPLE Ib

Preparation of Complexing Resin (A)

A preferred, more rapid method for preparing Resin (A), which does not involve the use of metallic lithium, is described as follows:

$PH(C_6H_5)_2$ + n-butyl Li → Li $P(C_6H_5)_2$ + butane

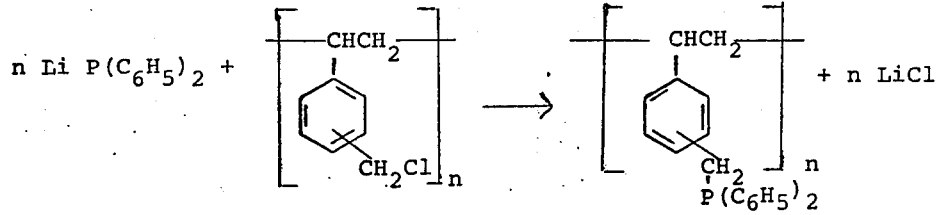

Diphenylphosphine (5.35 g., 28.6 mmol) was diluted with 10 ml. tetrahydrofuran and 28.6 mmol n-butyllithium (as a 2.2M solution in hexane) was added slowly thereto with stirring to obtain Li $P(C_2H_5)_2$ quantitatively. This solution was added slowly to about 5.0 g. of the chloromethylated polystyrene until a slight excess of Li $P(C_2H_5)_2$ was present. The suspension was stirred for 5 hours, then 1 ml. $C_2H_5$-OH was added to destroy the remaining Li $P(C_2H_5)_2$. The resin was washed four times with 25 ml methanol, then twice with 25 ml. tetrahydrofuran, and finally vacuum dried.

EXAMPLE II

Preparation of Anchored Rhodium catalysts a. 85 mg $\mu$-dichlorotetraethylene dirhodium$^{(I)}$ was stirred under nitrogen (20 hours, 25°C) with 343 mg. of Resin (A) prepared by the process of Example I. Ethylene was evolved and the anchored catalyst Resin-RhCl was obtained in accordance with Equation [1] set out hereinbefore.

b. 46 mg. of $\mu$-dichlorodicyclopentadiene-rhodium$^{(I)}$ was reacted with 58 mg. of Resin (A) in benzene for 24 hours at room temperature to yield a yellow product which gave indications of being the result of an incomplete displacement of olefin.

c. By reacting 406 mg of Resin (A), in benzene at 25°C with 95 mg of the complex bis-(ethylene)-rhodium acetylacetonate, ethylene was rapidly displaced from the complex by the $-P(C_6H_5)_2$ groups of the resin and a yellow product, Resin-Rh(acac) was obtained within minutes. The (acac)-group was rapidly replaced by chlorine upon treatment of the product with 0.1N HCl in ethanol at 25°C.

d. Carbon monoxide was rapidly evolved (within minutes) during the reaction of about 50 mg rhodium carbonyl chloride dimer $[Rh(CO)_2Cl]_2$ with excess of the Resin A in benzene at 25°C. The infrared spectrum of the yellow product had two carbon absorption bands. The anchored species is probably Resin-Rh(CO)Cl, analogous to the known $(PPh_3)_2$-Rh(CO)Cl.

EXAMPLE III

Preparation of Anchored Iridium Catalyst 60 mg. $Ir(cyclooctene)_2Cl$ was reacted with 500 mg. of Resin (A) suspended in benzene (20 hours, 25°C). The anchored Ir product is believed to be bonded to two or three $-P(C_6H_5)_2$ groups by analogy with related homogeneous catalysts.

EXAMPLE IV

Preparation of Anchored Ruthenium Catalyst a. Following the procedure of ROSE and WILKINSON as described in J. CHEM. SOC. (A), 1791, (1970), the cluster anion $[Ru_5Cl_{12}]^{2-}$ was first prepared by the reduction of hydrated $RuCl_3$ in methanol over platinum black. Then 0.2 mmol $[Ru_5Cl_{12}]^{2-}$ in 85 ml. methanol was reacted with 2 g. of Resin (A) at room temperature for a period of three days. Refluxing a portion of the reaction mixture indicated that the reaction was accelerated by heating.

b. Resin(A) + $RuCl_2(DMSO)_4$ → Resin-$RuCl_2(DMSO)_2$ + 2DMSO 500 mg. $RuCl_2(DMSO)$ (wherein DMSO is dimethylsulfoxide) prepared by a method described by Evans, Spencer, Wilkinson and Dalton in J. Chem Soc, 204 (1973), was refluxed with 150 mg. of Resin (A) in toluene to produce the anchored ruthenium catalyst shown in the equation above. It was difficult to remove the unreacted portion of $RuCl_2$ $(DMSO)_4$ from the resin product by normal washing procedures after filtration, but this separation was satisfactorily accomplished by Soxhlet extraction using ethanol. A comparison of infra-red spectroscopic data for the resin product with that for the complex $RuCl_2(DMSO)_2$ $P(C_6H_5)_3$ confirmed the product to be the anchored complex Resin-$RuCl_2(DMSO)_2$. This catalyst is only moderately effective in promoting $D_2$-ethanol exchange.

The processes of Examples II to IV give anchored complexes; however, if the starting materials contain metallic rhodium or if hydrated trichlorides of rhodium and ruthenium are used with the resin, some deposition of Rh or Ru metal on the resin will result.

EXAMPLE V

Use of Anchored Catalysts in H-D exchange $$HD + H_2O \rightleftarrows H_2 + HDO$$

$HD + ROH \rightleftarrows H_2 + ROD$ (where ROH is an alcohol)

a. The rates of $D_2$-$C_2H_5OH$ exchange have been measured for each of the anchored catalysts as prepared in Examples II to IV. In typical $D_2$-ethanol exchange experiments, a weighed amount of catalyst (about 100 mg.) was suspended in 20 ml. rapidly stirred, dry, degassed ethanol under 73 ml. $D_2$ gas at a partial pressure of 660 torr. The following results were obtained:

TABLE I

| Catalyst No. | Starting Metal Complex | Rate (×10⁴), Moles $D_2$/gram catalyst-sec |
|---|---|---|
| II(a) | $[(C_2H_4)_2RhCl]_2$ | 23.5+ |
| II(b) | $(C_{10}H_{12})Rh_2Cl_2$ | 12.6 |
| II(c) | $(C_2H_4)_2Rhacac$ | 3.5* |
| II(d) | $[Rh(CO)_2Cl]_2$ | 0 |
| III | $[(C_8H_{14})_2IrCl]_2$ | 6.0 |
| IV | $[Ru_5Cl_{12}]^{2-}$ | 0.3 |

+contained some Rh metal
*HCl added to displace acac

The rates quoted above are per unit weight of anchored catalyst which consists mainly of Resin (A).

Most survey exchange reactions have been between $D_2$ and ethanol to take advantage of the higher gas solubility in this solvent compared with that in water. The relative activities of the anchored catalysts, per equivalent of metal, were found qualitatively to be Iridium > Rhodium > Ruthenium The anchored catalysts are generally useful in promoting H-D exchange between hydrogen-containing gas streams and water or alcohol liquids.

b. Samples of anchored catalysts prepared by the processes set out in Examples II to IV were used in D-enrichment processes involving both water and ethanol. These catalyst samples were from batches different from those for which results are given in Table I. For deuterium exchange in water, the standard procedure for $D_2$-ethanol exchange was used except for the replacement of ethanol by water. The exchange rates for these catalyzed reactions are given in Table II.

TABLE II

| Catalyst No. | Starting Metal Complex | Rate of $D_2$ Exchange (×10⁶), Moles $D_2$/gram Catalyst-sec. | |
|---|---|---|---|
| | | in $H_2O$ | in $C_2H_5OH$ |
| II(a) | $[(C_2H_4)_2 RhCl]_2$ | 76.0 | 1700 |
| II(b) | $(C_{10}H_{12})Rh_2Cl_2$ | 105.0 | 25.4 |
| II(c) | $(C_2H_4)_2Rh$ acac | 8.3 | 6.9 |
| III | $[(C_8H_{14})_2 IrCl]_2$ | — | 11.4 |

EXAMPLE VI

Other Uses of Anchored Catalysts

Like homogenous catalysts, the anchored transition metal catalysts of this invention catalyze hydrogenation, hydroformylation and polymerization reactions. For example:

a. olefin to alkane $RCH\text{-}CH_2 + H_2 \xrightarrow{cat} RCH_2CH_3$ b. olefin to aldehyde $RCH=CH_2 + H_2 + CO \xrightarrow{cat} RCH_2CH_2CHO$ wherein R is an alkyl radical.

The anchored catalyst prepared by the process of Example II(c) promoted the hydrogenation of 1-butene at the rate of $1.9 \times 10^{-7}$ moles per gram of catalyst per second. Addition of excess anhydrous HCl increased the rate of hydrogenation to $13.5 \times 10^{-7}$ moles per gram, that is by a factor of about seven. The test conditions were as follows: catalyst: 80 mg.; solvent; 20 ml. ethanol; hydrogen; 680 torr; 1-butene: 0.2 mmol; HCl (when added): 0.09 mmol; cell volume; 120 ml.

While preferred embodiments of the invention have been described, it will be apparent to those skilled in the art that other Group VIII metal complexes may be anchored by the process of this invention and that other changes can be made without departing from the principles and spirit of the invention.

I claim:

1. A process for the catalyzed H-D exchange between hydrogen-containing gaseous streams and liquid water or alcohols characterized by the use therein of an anchored, transition metal catalyst prepared by reacting a diphenylphosphinomethylated polystyrene of the general formula:

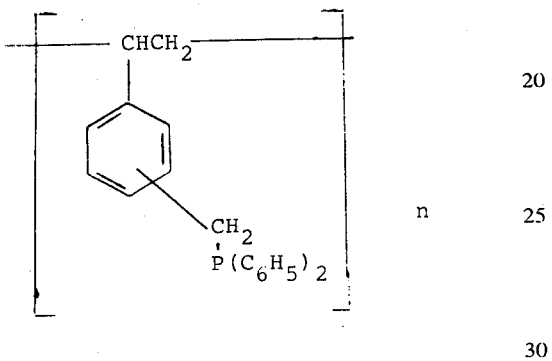

with an homogeneous, transition metal catalyst complex in which the transition metal is selected from the group consisting of ruthenium, rhodium and iridium, said complex containing a ligand weaker than the $-P(C_6H_5)_2$ attached to the resin and displaceable thereby.

2. The process of claim 1 wherein the homogeneous catalyst is μ-dichlorotetraethylene dirhodium.

3. The process of claim 1 wherein the homogeneous catalyst is μ-dichlorodicyclopentadiene-rhodium.

4. The process of claim 1 wherein the homogeneous catalyst is bis-(ethylene)-rhodium acetylacetonate, and including the step of treating the acetylacetonate product with HCl to produce the desired anchored catalyst.

5. The process of claim 1 wherein the homogeneous catalyst is iridiumdicyclooctene chloride.

* * * * *